Patented June 29, 1954

2,682,516

UNITED STATES PATENT OFFICE 2,682,516

MODIFIED CANE WAX AND METHOD OF PRODUCTION

Edward A. Wilder and Edward Spurgat, Racine, Wis., assignors to S. C. Johnson & Son, Inc., Racine, Wis.

No Drawing. Application May 4, 1953, Serial No. 353,013

12 Claims. (Cl. 260—28)

This invention relates to a method of treating partially refined sugar cane wax and the product resulting therefrom. More particularly, the invention relates to a method of substantially improving the oil retention and oil and dye bleed resistance properties of deoiled, but non-deresinated sugar cane wax and a new and improved wax product produced by such method.

Crude sugar cane wax consists essentially of three components, a hard wax fraction, an oily or soft fraction, and a resinous fraction. If the oily and resinous fractions are removed, the remaining hard fraction, modified by such methods as oxidation and the addition of certain resinous materials, as taught, for example, in co-pending application, Serial Number 248,264, is then qualified for use in the carbon paper industry. However, this fraction constitutes only approximately 40% by weight of the original crude wax, the oily and resinous fractions being disposed of as material of secondary value. Obviously, this low yield incurs a cost which restricts the extensive use of sugar cane wax on a commercial scale in this industry.

We have discovered a method for treating sugar cane wax whereby disposal of the resinous fraction is not required and both the hard and resinous fractions of the crude wax can be utilized in combination. Their physical and chemical properties are so improved as to render the combination even more satisfactory for use in the carbon paper industry than the use of the hard fraction alone.

This method involves the treatment of deoiled, but non-deresinated sugar cane wax and comprises melting the wax, maintaining the wax at a temperature of from 80° C. to 150° C. while introducing oxygen-containing gas into the wax until the acid number of the wax reaches a point within a range of from 22 to 38. When this acid number is attained, from 2 to 20% by weight of para-phenyl phenol-formaldehyde resin is added and the introduction of oxygen-containing gas is continued until the mixture attains an oil-retention-penetration value of 55 or less. With the molten wax maintained at a minimum of 120° C., from 5 to 11.5% by weight of the wax charge of a material selected from the group consisting of maleic, succinic and glutaric anhydrides is reacted to esterify from 40 to 85% of the free wax hydroxyl groups.

We have also discovered, as a result of the employment of the above process, a new and improved modified wax which is a deoiled, non-deresinated sugar cane wax comprising from 2 to 20% by weight of the wax of para-phenyl phenol-formaldehyde resin and partially esterified with a material selected from the group consisting of maleic, succinic and glutaric anhydrides.

Now having indicated in a general way the nature and purpose of this invention, the following examples will illustrate the invention. It is to be understood, however, that such examples are presented merely as illustrations of the invention and are not to be construed as limiting the same.

Example 1

900 grams of deoiled, non-deresinated sugar cane wax which had the following characteristics was melted in a suitable reaction vessel.

1. Oil-retention-penetration value _____ 90.
2. Dye bleed resistance _____ Poor.
3. Oil bleed resistance _____ Poor.

The wax was heated to 115° C. and air was introduced into the molten wax through the bottom of the vessel by means of a gas dispersion tube at a rate of approximately 20 cubic feet per hour. Simultaneous with the entrance of air into the vessel, mechanical agitation was conducted immediately above the air entrance. The reaction was continued until the wax attained an acid number of 30, at which time 100 grams of para-phenyl phenol-formaldeyhde resin was added and the introduction of air with agitation continued for approximately two more hours. With the air supply discontinued and temperature adjusted to 135° C., 110 grams of succinic anhydride was added. The agitation was continued and the temperature maintained at 135° C. for approximately two more hours, at which time the wax was cooled and had the following characteristics.

1. Oil-retention-penetration value _____ 25.
2. Dye bleed resistance _____ Good.
3. Oil bleed resistance _____ Good.

Example 2

900 grams of deoiled, non-deresinated sugar cane wax was treated exactly as in Example 1, except that maleic anhydride was substituted for the succinic anhydride used in that example. After treatment, the product had the following characteristics.

1. Oil-retention-penetration value _____ 28.
2. Dye bleed resistance _____ Good.
3. Oil bleed resistance _____ Good.

Example 3

900 grams of deoiled, non-deresinated sugar cane wax was treated exactly as in Example 1, except that glutaric anhydride was substituted for the succinic anhydride used in that example. After treatment, the product had the following characteristics.

1. Oil-retention-penetration value _____ 35.
2. Dye bleed resistance _____ Good.
3. Oil bleed resistance _____ Good.

*Example 4*

900 grams of deoiled, non-deresinated sugar cane wax was processed exactly as described in Example 1, except that 40 grams of succinic anhydride was substituted for the 110 grams of anhydride used in Example 1. The product had the following characteristics.

1. Oil-retention-penetration value _____ 50.
2. Dye bleed resistance _____ Fair.
3. Oil bleed resistance _____ Fair.

Modified sugar cane wax having good oil retention and oil and dye bleed resistance properties can be utilized in the carbon paper industry. If the wax is incapable of forming a firm physical structure with ink oil in the proportions normally used it has poor oil retention and the coating formed from it is greasy and smeary, causing easy and unintentional removal from the carbon paper. This property is measured in terms of an oil-retention-penetration value. It has been found that when a wax product has an oil-retention-penetration value of less than 45, it is then satisfactory for use. The oil-retention-penetration determinations in the preceding examples were conducted by melting at 100° C. 25 grams of the wax product together with 25 grams of ink oil. The mixture was stirred to uniformity and poured into an aluminum foil dish approximately 2½ inches in diameter and ½ inch deep. After the mixture had solidified, it was conditioned at 25° C. for two hours or more. The depth of penetration in the mixture in 5 seconds with the needle having a 9°-angle point, carrying a weight to provide a total of 100 grams, was then determined. The oil-retention-penetration value is represented as the penetration in $\tfrac{1}{10}$ millimeters. The apparatus used was that designated in American Society for Testing Materials: Designation D-217-48.

A sugar cane wax which has been completely deoiled and deresinated usually bears an oil-retention-penetration value of not less than 45. Yet, it will be noted that the non-deresinated waxes treated in Examples 1, 2 and 3 showed a value which is even more acceptable than the deresinated type; that is, less than 45.

However, as will be noted in Example 4, when less than 5% by weight of the wax of the anhydride is reacted with the free wax hydroxyl groups, the product will have an oil-retention-penetration value greater than 45 and will be of poor value for use in carbon paper coating because greater amounts of the wax would be needed to attain hardness. Under the conditions of our process, not more than 11.5% of anhydride will react with the wax hydroxyls.

Oil and dye bleed resistance is the ability of the carbon paper to retain the oil and dyes, even under heat and pressure. This quality is particularly important in the preparation of business forms which contain intermittently superposed carbon and white paper. Should the wax not possess a satisfactory resistance to oil and dye bleed, when these forms are stored the oil and dyes from the carbon paper will migrate and stain the white paper.

A test, which was devised by Moore Business Forms Corporation, is the following and was used in the foregoing examples:

Six grams of the wax to be tested is admixed with 94 grams of a standard mixture of paraffin oil, pigment and dye and heated to 95–100° C. While still hot, a coating .005 inch thick is placed on a No. 10 carbonizing tissue between 8 sheets of No. 12 white bond paper. Two 208 gram steel sheets are placed on either side of the sheets of paper and placed in a 46° C. oven for four hours.

The oil and dye bleed characteristics are then compared with the results of a standard wax. A selected ouricury wax was used as the standard in our work because it is now used extensively in the carbon paper industry. A reading of "good" is equivalent to the standard, "fair" is not quite up to standard, and "poor" is obviously inferior. It will be noted that the products of Examples 1, 2 and 3 evidenced a dye and oil bleed resistance which was "good." Normally, deoiled and completely deresinated sugar cane wax, even when oxidized in the manner prescribed, has poor oil and dye bleed resistance. It will be appreciated from Example 4 that where less than 5% of anhydride by weight of the wax is reacted with the free wax hydroxyls, the oil and dye bleed resistance is only fair.

In order to obtain these three highly improved characteristics, the deoiled, non-deresinated sugar cane wax must be oxidized until the wax attains an acid number of at least 22, but not more than 28, before the para-phenyl phenol-formaldehyde resin is added. If the wax is not oxidized to an acid value of at least 22 before addition of the para-phenyl phenol-formaldehyde resin, the resin inhibits further oxidation and prevents the product from attaining an oil-retention-penetration value of 55 and the subsequent attainment of an oil-retention-penetration value of less than 45. If the wax is oxidized past an acid value of 38, the wax molecules begin to degrade into lower molecular weight components and the wax becomes objectionably softer.

The amount of para-phenyl phenol-formaldehyde resin which is added to the wax can be varied within a range of from 2 to 20% by weight of the wax. Smaller amounts give a final product with an oil-retention-penetration value greater than 45 and no noticeable improvement in the oil and dye bleed characteristics. If more than 20% of para-phenyl phenol-formaldehyde resin is used, the product loses its wax-like characteristics and is unsuitable as a carbon paper coating.

After the para-phenyl phenol-formaldehyde resin is added, oxidation must be conducted until the mixture has an oil-retention-penetration value of not more than 55 before the anhydride is added. Should the anhydride be admixed before this value has lowered to 55 or less, the anhydride reaction will not reduce the oil-retention-penetration value sufficiently to bring it within the operable limitation of 45 or less.

The only anhydrides operable are maleic, succinic and glutaric. The amounts of anhydride reacted with the wax hydroxyl groups can be varied from 5 to 11.5% by weight of the wax. In practice, a slight excess can be used to force the reaction and to make up for any anhydride which may be lost through sublimation. Any excess may be washed or blown out at the completion of the reaction, but small amounts of residual unreacted anhydride will not adversely affect the product properties. Based on the original hydroxyl value of the wax, the theoretical limit of anhydride used is about 12.66% by weight of the wax. In practice, it has been found that under the conditions of our process only approximately 11.5% reacts with the wax hydroxyls and under ordinary conditions, should any additional anhydride be added, it will not chemically combine with the wax molecules.

The temperature of the reaction, depending on the interests and requirements, can be varied from 80° C. to 150° C. until the anhydride is added, at which time the temperature must be maintained at a minimum of 120° C. Temperatures in excess of 150° C. cause deterioration of the wax molecules and, in addition, during the anhydride modification high temperatures cause excessive loss of anhydride through sublimation. During the oxidation a temperature below 80° C., or below 120° C., during the esterification step, slows the reaction to a negligible rate. The optimum temperature for oxidation is approximately 115° C. At this temperature the reaction proceeds at a rapid rate with a minimum of detrimental oxidation which would cause discoloration and degradation of the wax molecues. The optimum temperature for the anhydride reaction is 135° C.

It will be noted that in Example 1 where a 900 gram charge of hard wax fraction was being treated, the oxygen-containing gas was introduced into the molten wax at a rate of approximately 20 cubic feet per hour or approximately 10 cubic feet per hour per pound of wax. It should be appreciated that this flow rate may be varied depending upon several factors, as for example, the size and shape of the vessel, type of agitation employed, and the amount of time to be allowed the reaction. However, we have found that in almost all applications, when the gas employed is air, containing the usual 20 per cent oxygen, the flow rate should be maintained at not less than three nor more than fifteen cubic feet per hour per pound of wax.

It is preferred that agitation of the molten wax be conducted while the oxygen-containing gas is being admitted to the vessel, as well as during the addition of the resin. As in most chemical reactions, effective agitation increases the rate and homogeneity of the reaction.

Thus, through the practice of our invention, it is no longer necessary to deresinate sugar cane wax in order to qualify it for use in the carbon paper industry. Actually, through the use of the process above-described, a modified non-deresinated sugar cane wax can be produced which has more desirable characteristics for such applications than one which has been previously deresinated.

Other modes of applying the invention may be employed instead of those explained, change being made as regards the process herein described and/or its new and improved wax product, provided the step or steps stated or the new and improved wax product described in any of the following claims or the equivalent of such stated step or steps or product be employed.

We claim:

1. A method of treating deoiled, non-deresinated sugar cane wax comprising melting said wax, maintaining said molten wax at a temperature of from 80° C. to 150° C. while introducing gas comprising free oxgen into said wax until the acid number of said wax is within a range of from 22 to 38, admixing from 2 to 20% by weight of said wax of para-phenyl phenol-formaldehyde resin, continuing to introduce said gas until said mixture has an oil-retention-penetration value of 55 or less, maintaining said mixture at a temperature of from 120° C. to 150° C., reducing said oil-retention-penetration value to less than 45 by esterifying with from 5 to 11.5% by weight of the wax charge of a material selected from the group consisting of maleic, succinic and glutaric anhydrides.

2. A method of treating deoiled, non-deresinated sugar cane wax comprising melting said wax, maintaining said molten wax at a temperature of from 80° C. to 150° C. while introducing gas comprising free oxygen into said wax until the acid number of said wax is within a range of from 22 to 38, admixing from 2 to 20% by weight of said wax of para-phenyl phenol-formaldehyde resin, continuing to introduce said gas until said mixture has an oil-retention-penetration value of 55 or less, maintaining said mixture at a temperature of from 120° C. to 150° C., reducing said oil-retention-penetration value to less than 45 by esterifying with from 5 to 11.5% by weight of the wax charge of maleic anhydride.

3. A method of treating deoiled, non-deresinated sugar cane wax comprising melting said wax, maintaining said molten wax at a temperature of from 80° C. to 150° C. while introducing gas comprising free oxygen into said wax until the acid number of said wax is within a range of from 22 to 38, admixing from 2 to 20% by weight of said wax of para-phenyl phenol-formaldehyde resin, continuing to introduce said gas until said mixture has an oil-retention-penetration value of 55 or less, maintaining said mixture at a temperature of from 120° C. to 150° C., reducing said oil-retention-penetration value to less than 45 by esterifying with from 5 to 11.5% by weight of the wax charge of succinic anhydride.

4. A method of treating deoiled, non-deresinated sugar cane wax comprising melting said wax, maintaining said molten wax at a temperature of from 80° C. to 150° C. while introducing gas comprising free oxygen into said wax until the acid number of said wax is within a range of from 22 to 38, admixing from 2 to 20% by weight of said wax of para-phenyl phenol-formaldehyde resin, continuing to introduce said gas until said mixture has an oil-retention-penetration value of 55 or less, maintaining said mixture at a temperature of from 120° C. to 150° C., reducing said oil-retention-penetration value to less than 45 by esterifying with from 5 to 11.5% by weight of the wax charge of a glutaric anhydride.

5. A deoiled, non-deresinated sugar cane wax, oxidized to an acid number of 22 to 38, said wax being modified by the addition of 2 to 20% by weight of para-phenyl phenol-formaldehyde resin, being partially esterified with an anhydride of the group consisting of maleic, succinic, and glutaric, and having an oil-retention-penetration value of less than 45.

6. A deoiled, non-deresinated sugar cane wax, oxidized to an acid number of 22 to 38, said wax being modified by the addition of 2 to 20% by weight of para-phenyl phenol-formaldehyde resin, being partially esterified with maleic anhydride, and having an oil-retention-penetration value of less than 45.

7. A deoiled, non-deresinated sugar cane wax, oxidized to an acid number of 22 to 38, said wax being modified by the addition of 2 to 20% by weight of para-phenyl phenol-formaldehyde resin, being partially esterified with succinic anhydride, and having an oil-retention-penetration value of less than 45.

8. A deoiled, non-deresinated sugar cane wax, oxidized to an acid number of 22 to 38, said wax being modified by the addition of 2 to 20% by weight of para-phenyl phenol-formaldehyde resin, being partially esterified with glutaric anhydride, and having an oil-retention-penetration value of less than 45.

9. A deoiled, non-deresinated sugar cane wax, oxidized to an acid number of 22 to 38, said wax being modified by the addition of 2 to 20% by weight of para-phenyl phenol-formaldehyde resin, and being partially esterified with from 5 to 11.5% by weight of said wax of an anhydride of the group consisting of maleic, succinic and glutaric.

10. A deoiled, non-deresinated sugar cane wax, oxidized to an acid number of 22 to 38, said wax being modified by the addition of 2 to 20% by weight of para-phenyl phenol-formaldehyde resin, and being partially esterified with from 5 to 11.5% by weight of said wax of maleic anhydride.

11. A deoiled, non-deresinated sugar cane wax, oxidized to an acid number of 22 to 38, said wax being modified by the addition of 2 to 20% by weight of para-phenyl phenol-formaldehyde resin, and being partially esterified with from 5 to 11.5% by weight of said wax of succinic anhydride.

12. A deoiled, non-deresinated sugar cane wax, oxidized to an acid number of 22 to 38, said wax being modified by the addition of 2 to 20% by weight of para-phenyl phenol-formaldehyde resin, and being partially esterified with from 5 to 11.5% by weight of said wax of glutaric anhydride.

No references cited.